(12) United States Patent
Zheng et al.

(10) Patent No.: US 8,009,620 B2
(45) Date of Patent: Aug. 30, 2011

(54) VARIABLE HEADER TYPES FOR PERSISTENT RESOURCE ALLOCATION IN A WIRELESS NETWORK

(75) Inventors: Haihong Zheng, Coppell, TX (US); Shashikant Maheshwari, Irving, TX (US); Adrian Boariu, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 776 days.

(21) Appl. No.: 12/118,476

(22) Filed: May 9, 2008

(65) Prior Publication Data

US 2009/0279488 A1    Nov. 12, 2009

(51) Int. Cl.
*H04W 72/04*    (2009.01)
*H04W 74/02*    (2009.01)

(52) U.S. Cl. ......... 370/329; 370/338; 370/477; 455/451

(58) Field of Classification Search .................. 370/252, 370/310, 328, 329, 330, 338, 477; 375/260; 455/450, 451, 452.1

See application file for complete search history.

(56) References Cited

U.S. PATENT DOCUMENTS

| | | | | |
|---|---|---|---|---|
| 2008/0019327 A1* | 1/2008 | Kwon et al. | | 370/336 |
| 2008/0117891 A1* | 5/2008 | Damnjanovic et al. | | 370/345 |
| 2008/0130590 A1* | 6/2008 | Kim et al. | | 370/336 |
| 2008/0232284 A1* | 9/2008 | Dalsgaard et al. | | 370/310 |
| 2008/0310356 A1* | 12/2008 | Cai et al. | | 370/329 |
| 2009/0046639 A1* | 2/2009 | Cai et al. | | 370/329 |
| 2009/0075667 A1* | 3/2009 | Bourlas | | 455/452.1 |
| 2009/0257389 A1* | 10/2009 | Mohanty et al. | | 370/329 |
| 2009/0268693 A1* | 10/2009 | Lindh et al. | | 370/336 |
| 2009/0285163 A1* | 11/2009 | Zhang et al. | | 370/329 |

OTHER PUBLICATIONS

Bourlas, Yair, "Persistent Allocation", IEEE C802.16maint-08/095r4, IEEE 802.16 Broadband Wireless Access Working Group, http://ieee802.org/16, (Mar. 17, 2008).

* cited by examiner

*Primary Examiner* — Chi H Pham
*Assistant Examiner* — Ahmed Elallam
(74) *Attorney, Agent, or Firm* — Brake Hughes Bellermann LLP

(57) ABSTRACT

Various example embodiments are disclosed herein. According to an example embodiment, an apparatus may include a wireless receiver configured to receive a persistent resource allocation, the persistent resource allocation providing a periodically recurring resource, and a wireless transmitter configured to transmit a persistent data burst in a first frame via the persistent resource allocation, the persistent data burst including a compressed MAC (media access control) header that excludes (or omits) a connection identifier (CID) field, wherein the compressed MAC header of the persistent data burst includes a field that indicates that the MAC header of the persistent data burst is compressed.

22 Claims, 8 Drawing Sheets receiving a persistent resource allocation, the persistent resource allocation providing a periodically recurring resource; and    610 transmitting a persistent data burst in a first frame via the persistent resource allocation, the persistent data burst including a compressed MAC (media access control) header that excludes a connection identifier (CID) field, wherein the compressed MAC header of the persistent data burst includes a field that indicates that the MAC header of the persistent data burst is compressed.    620

VARIABLE HEADER TYPES FOR PERSISTENT RESOURCE ALLOCATION IN A WIRELESS NETWORK

TECHNICAL FIELD

This description relates to wireless networks.

BACKGROUND

In some types of wireless networks, a Map may typically be used to allocate uplink (UL) and/or downlink (DL) resources to mobile stations (MS) (or subscriber stations). For example, a Map Information Element (Map IE) may be sent by a base station (BS) or other infrastructure node that specifies a location (e.g., symbol offset) and length of the resource allocation that is assigned to a MS or connection for a subsequent frame. In this manner, a BS may transmit a Map IE to allocate a burst or group of symbols to a MS for a frame. If resources are to be allocated for multiple frames, then the BS would typically transmit a Map IE for each frame for which resources will be allocated.

However, some types of applications, such as periodic traffic applications, may transmit or receive a substantially predictable amount of traffic over a recurring interval or period of time (but possibly with some amount of variation). For example, a Voice Over IP (Internet Protocol) application or device may generate and/or receive a substantially predictable amount of traffic every 20 ms. To more efficiently allocate a periodically recurring resource to such a device or application (for example), it has been recently proposed to provide a persistent resource allocation. With a persistent allocation, a BS may assign or allocate the persistent resource, which may provide the resource (e.g., a burst size or specified number of symbols) at a recurring period, such as by providing a resource every frame, every 4 frames, etc. This persistent allocation may continue until the BS sends another IE to deallocate the persistent resource. However, in some cases, a persistent resource allocation may waste resources if the resource goes unused, e.g., during VOIP silence periods. It may be desirable to provide a more flexible approach for the use of persistent resource allocations.

SUMMARY

According to an example embodiment, a method may include determining a persistent resource allocation, the persistent resource allocation providing a periodically recurring resource, the persistent resource allocation being assigned to a first connection identifier (CID), transmitting a persistent data burst in a first frame via the persistent resource allocation, the persistent data burst including a compressed MAC (media access control) header that excludes a CID field, wherein the compressed MAC header of the persistent data burst includes a field indicating that the MAC header of the persistent data burst is compressed, and transmitting a non-persistent data burst in a second frame via the persistent resource allocation, the non-persistent data burst including a regular or un-compressed MAC (media access control) header that includes a second CID.

According to an example embodiment, an apparatus may be configured to determine a persistent resource allocation, the persistent resource allocation providing a periodically recurring resource, the persistent resource allocation being assigned to a first connection identifier (CID). The apparatus may include a wireless transmitter (e.g., transmitter of transceiver 802) may be configured to transmit a persistent data burst in a first frame via the persistent resource allocation, the persistent data burst including a compressed MAC (media access control) header that excludes a CID field, the MAC header of the persistent data burst including a field that indicates that the MAC header of the persistent data burst is compressed; and the wireless transmitter may be configured to transmit a non-persistent data burst in a second frame via the persistent resource allocation, the non-persistent data burst including a regular or un-compressed MAC (media access control) header that includes a second CID, the MAC header of the non-persistent data burst including a field that indicates that the MAC header of the persistent data burst is un-compressed.

According to another example embodiment, a method may include receiving a persistent resource allocation, the persistent resource allocation providing a periodically recurring resource, and transmitting a persistent data burst in a first frame via the persistent resource allocation, the persistent data burst including a compressed MAC (media access control) header that excludes a connection identifier (CID) field, wherein the compressed MAC header of the persistent data burst includes a field that indicates that the MAC header of the persistent data burst is compressed.

According to another example embodiment, an apparatus may include a wireless receiver configured to receive a persistent resource allocation, the persistent resource allocation providing a periodically recurring resource; and a wireless transmitter configured to transmit a persistent data burst in a first frame via the persistent resource allocation, the persistent data burst including a compressed MAC (media access control) header that excludes a connection identifier (CID) field, wherein the compressed MAC header of the persistent data burst includes a field that indicates that the MAC header of the persistent data burst is compressed.

According to another example embodiment, a method may include receiving, at a mobile station (MS), a persistent resource allocation, the persistent resource allocation providing a periodically recurring resource, the persistent resource allocation being assigned to a connection identifier (CID) that is associated with a periodic traffic application of the MS that generates periodic traffic, transmitting, from the periodic traffic application of the MS, a persistent data burst in a first frame via the persistent resource allocation, the persistent data burst including a compressed MAC (media access control) that excludes a CID field, and transmitting, from the MS during a silence period of the periodic traffic application, a non-persistent data burst in a second frame via the persistent resource allocation, the non-persistent data burst including a regular or un-compressed MAC (media access control) header that includes a second CID associated with the MS.

According to yet another example embodiment, an apparatus may include a wireless receiver configured to receive, at a mobile station (MS), a persistent resource allocation, the persistent resource allocation providing a periodically recurring resource, the persistent resource allocation being assigned to a connection identifier (CID) that is associated with a periodic traffic application of the MS that generates periodic traffic, a wireless transmitter configured to transmit, from the periodic traffic application of the MS, a persistent data burst in a first frame via the persistent resource allocation, the persistent data burst including a compressed MAC (media access control) that excludes a CID field, and the wireless transmitter further configured to transmit, from the MS during a silence period of the periodic traffic application, a non-persistent data burst in a second frame via the persistent resource allocation, the non-persistent data burst including a regular or un-compressed MAC (media access control) header that includes a second CID associated with the MS.

The details of one or more implementations are set forth in the accompanying drawings and the description below. Other features will be apparent from the description and drawings, and from the claims.

DETAILED DESCRIPTION

Figure 1:
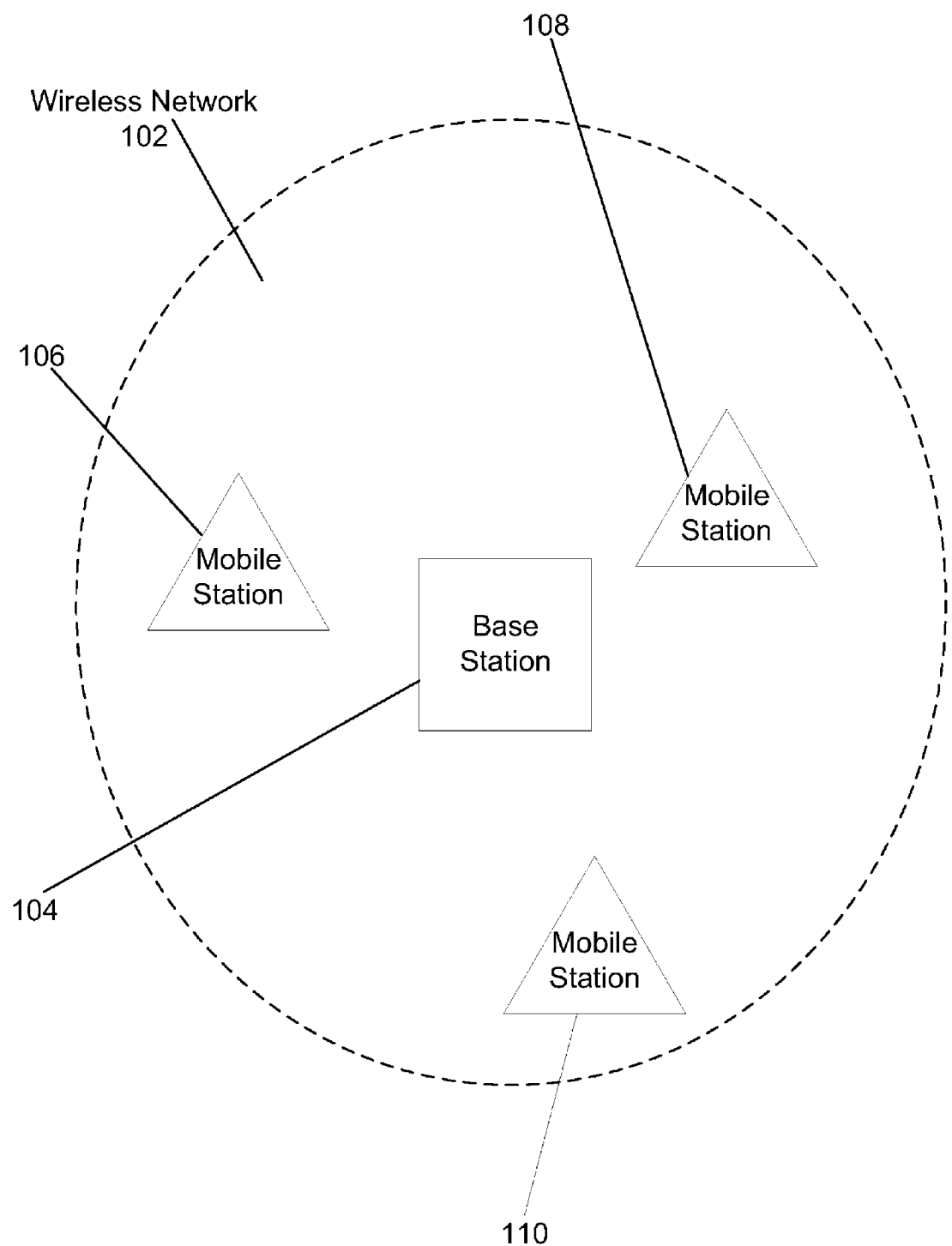
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include, for example, an IEEE 802.16 Wireless Metropolitan Area Network (WiMAX), an IEEE 802.11 Wireless Local Area Network (WLAN), or a cellular telephone network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" may include any type of wireless node, such as base stations, mobile stations, etc. While the present disclosure may use some of the terminology of WiMAX or other wireless standards, aspects of the present disclosure may be applicable to any networking or wireless technologies.

Mobile stations in a wireless network may be divided up into two groups (for example) to provide a more efficient use of channel resources, so that a base station (BS) may allocate the uplink carrier frequency and the downlink carrier frequency resources to different groups at a time, or in an alternating or interleaved fashion, to allow HD MSs to use both the uplink and downlink resources. For example, during one time period, a first group (or group 1 of HD MSs) of mobile stations may receive in a downlink direction, while a second group (group 2 of HD MSs) of mobile stations is allowed to transmit in an uplink direction to the BS or infrastructure node. Then, during a second time period, the first group may transmit and the second group may receive.

Figure 2:
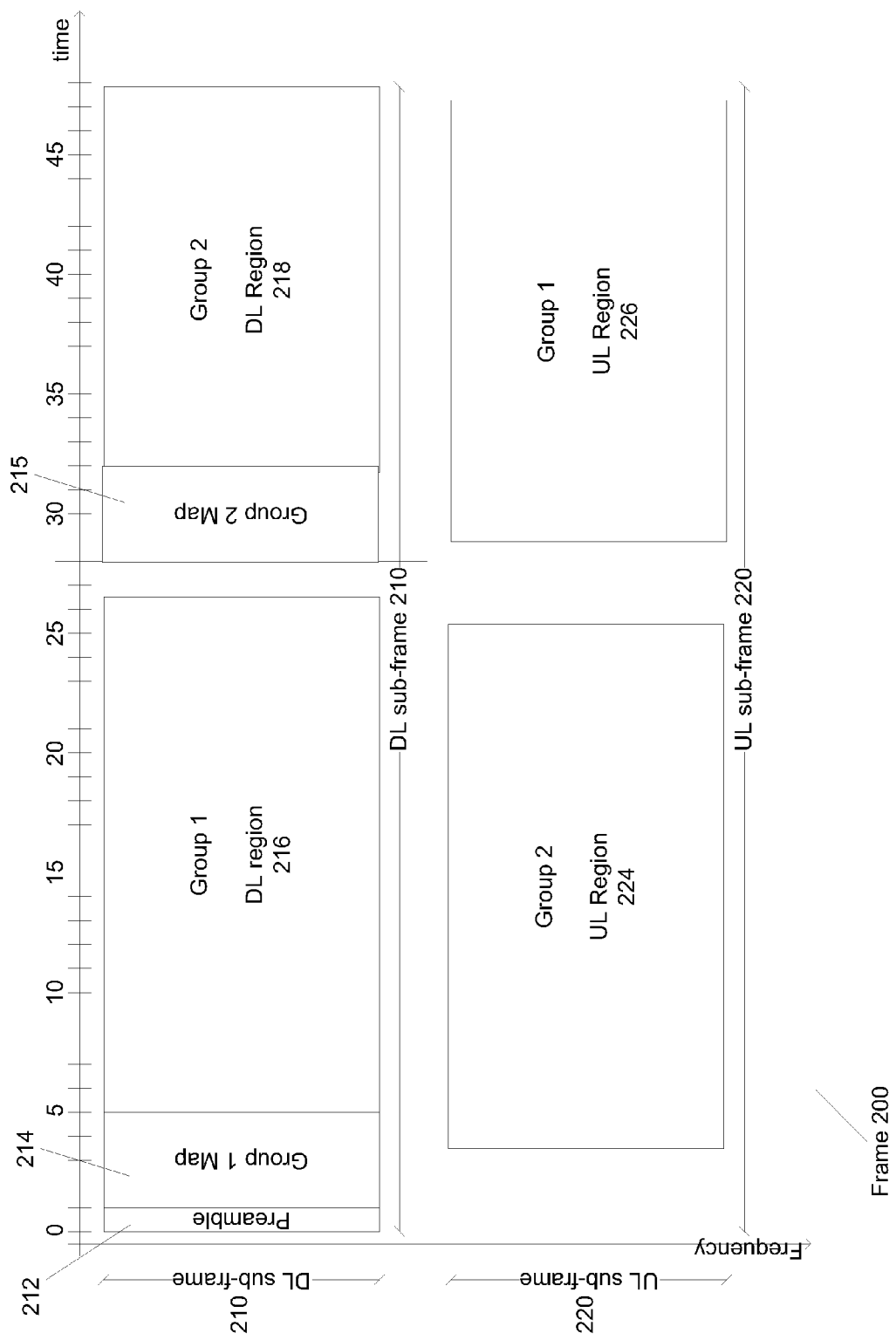
FIG. 2 is a diagram illustrating an example embodiment of a frame that may be used according to an example embodiment.

FIG. 2 is a diagram illustrating an example embodiment of a frame. The example frame 200 may include a DL (downlink) subframe 210 that includes signals transmitted from a base station and received at one or more mobile stations. Frame 200 may include an UL (uplink) subframe 220 that includes signals transmitted from one or more mobile stations and received by a base station. The frame 200 illustrates an example of a FDD system in which one or more mobile stations may receive DL signals via a first frequency (e.g., f1), or first set of frequencies, within a DL subframe 210, and may transmit signals UL to a base station via a second frequency (e.g., f2), or second set of frequencies, within an UL subframe 220. Other types of frames may be used as well, as the frame 200 is merely an example.

The DL subframe 210 may include a common preamble 212, since preamble 212 is directed to all groups (e.g., directed to mobile stations for both group 1 and group 2). The preamble 212 may allow mobile stations to perform synchronization. A group-specific Map may be provided for each DL region of frame 200. For example, a group 1 DL region 216 may include a group 1 Map 214, while a group 2 DL region 218 may include a group 2 Map 215. Each Map may include a DL Map and an UL Map, each including information elements identifying resources for downlink and uplink transmissions for one or more mobile stations. Each Map (e.g., Maps 214 and Map 215) may, for example, include Map IEs (information elements) that allocate resources for uplink and/or downlink transmissions for one or more mobile stations. The uplink (UL) subframe 220 may include resources (e.g., OFDM symbols) that allow mobile stations to transmit data to a base station.

The Maps may also provide the grouping information of mobile stations to different groups. The Maps may also include an indication for changing the mobile station from one zone/group to another zone/group.

The UL frame 220 may include at the beginning a switching period (TTG, or BS transmit/receive transition gap). The UL frame 220 may also include a group 2 UL region 224 to allow mobile stations of group 2 to transmit to the base station, and a group 1 UL region 226 to allow group 1 mobile stations to transmit to the base station. In some cases, Full-Duplex (FD) mobile stations (having the ability to transmit and receive on different frequencies at the same time) may receive data during either group 1 DL region 216 and/or group 2 DL region 218, and may transmit (or obtain resources for UL transmission) to the BS via either group 2 UL region 224 and/or group 1 UL region 226.

Figure 3:
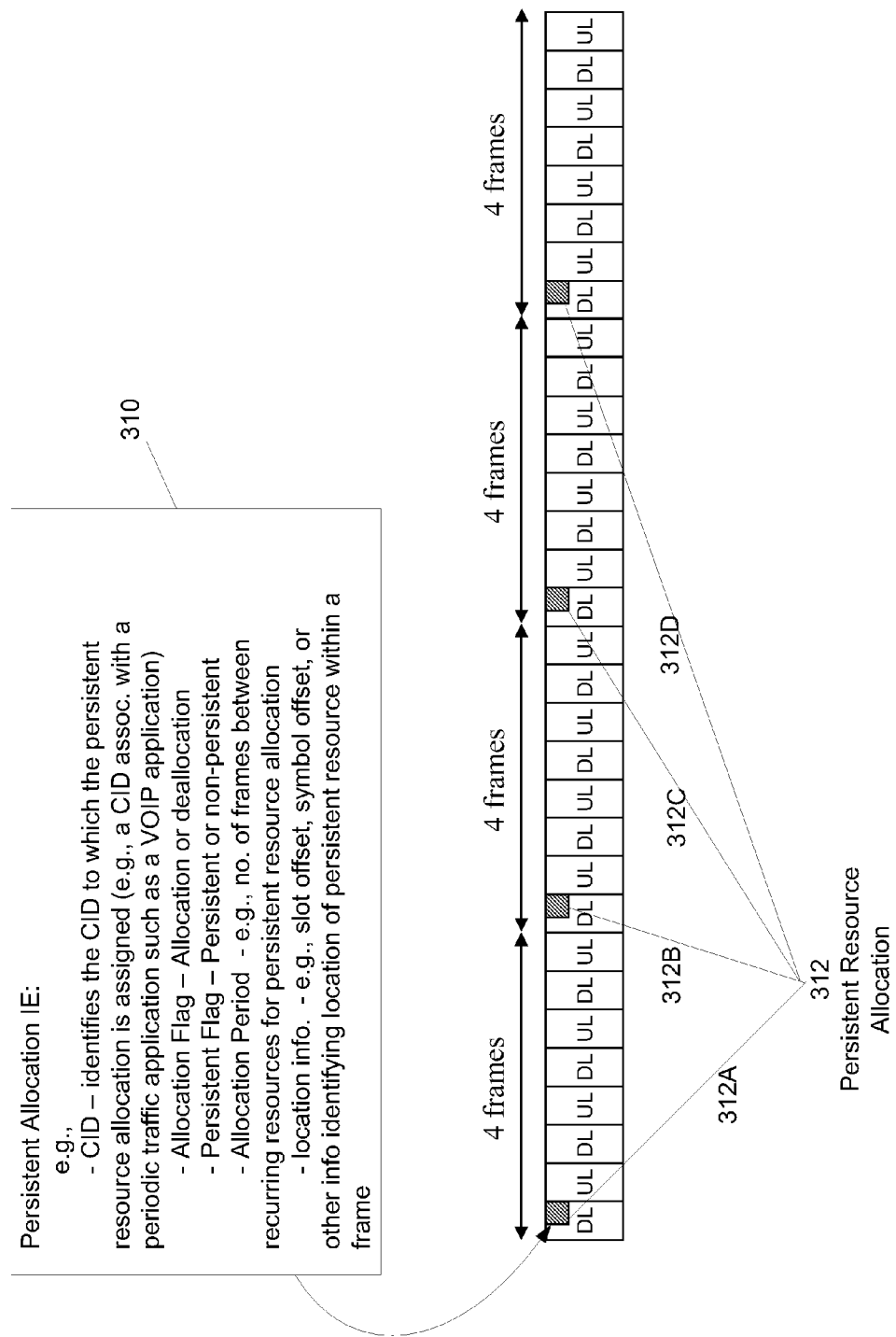
FIG. 3 is a diagram illustrating a persistent resource allocation according to an example embodiment.

FIG. 3 is a diagram illustrating a persistent resource allocation according to an example embodiment. According to an example embodiment, a BS may assign a persistent resource allocation 312 to a MS or to a connection identifier (CID) by sending a persistent allocation IE 310 (which may also be referred to as a persistent Map IE or simply as persistent IE). The persistent resource allocation may be assigned or allocated to a MS or CID, with a specified recurring period. The persistent resource allocation (e.g., its location in a frame, number of symbols) and the associated MCS (modulation rate and coding scheme) for the persistent resource may be fixed until the persistent resource allocation is deallocated when the BS sends another persistent allocation IE indicating deallocation. Thus, for traffic that may be transmitted or received periodically or predictably, it is not necessary to send a burst assignment (or resource allocation) for every frame. Rather, a persistent allocation IE 310 may be used to assign a persistent resource allocation (e.g., which may include a periodically recurring resource assigned to a MS or CID), which may continue until the BS deallocates the persistent resource allocation.

Referring to FIG. 3, a persistent allocation IE 310 may be sent by a BS to allocate a persistent resource allocation 312 to a MS or CID (connection identifier). The persistent resource allocation 312 may include resources in each of multiple frames, such as providing a periodically recurring resource (e.g., a burst or resource every frame, every two frames, every three frames, every four frames, or other period). The persistent resource allocation 312 may include periodically recurring resources, such as resources 312A, 312B, 312C, 312D, etc. Although the persistent resource allocation 312 is shown for DL resources, a persistent resource allocation may also be provided for UL resources. The resources 312A, 312B, 312C and 312D are provided every 4 frames (e.g., a burst or group of symbols every 20 ms, if each frame is 5 ms. For example, an application (such as a VOIP application) provided at the MS may either generate or receive periodic traffic (e.g., a predictable amount of traffic over a period of time, possibly with some amount of variation). Thus, the BS may assign a persistent resource allocation to the CID associated with the VOIP application (or to the MS), and this persistent resource allocation may continue until the BS sends another persistent allocation IE indicating deallocation of the persistent resource.

As shown in FIG. 3, an example of a persistent allocation 310 is shown, and may include one or more fields, such as, for example: a CID—which may identify the CID or MS to which the persistent resource allocation (or deallocation) is assigned; an allocation flag—indicating allocation or deallocation; persistent flag—indicates a persistent or non-persistent allocation; allocation period, e.g., the number of frames between recurring resources for the persistent resource allocation; location information, e.g., slot offset, symbol offset or other information that may identify the location of each recurring resource in each frame for the persistent resource allocation; and length—which may identify a length (e.g., number of symbols) of each recurring resource of the persistent resource allocation. These are merely some example fields, and other fields may be included.

Figure 4:
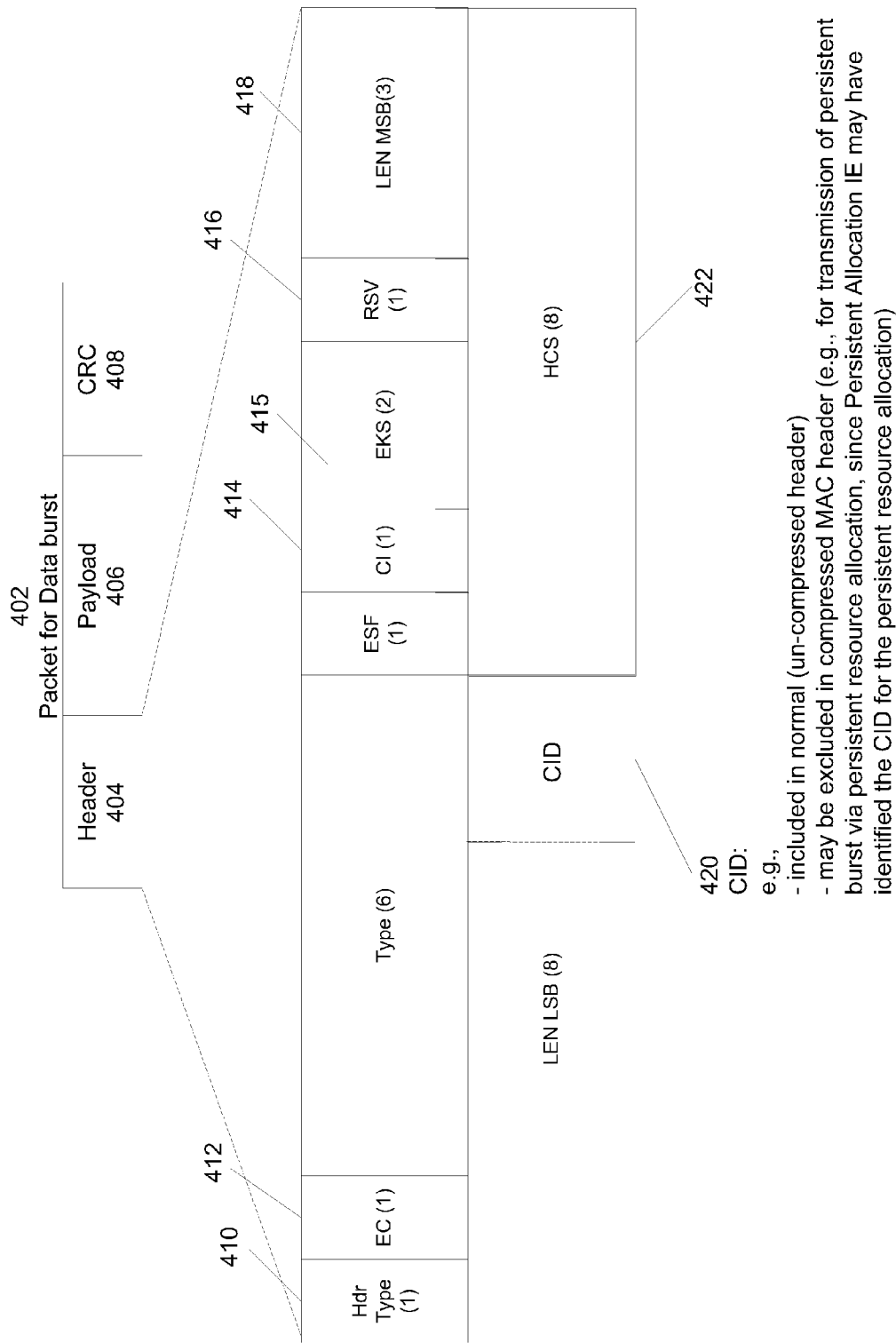
FIG. 4 is a block diagram illustrating a packet according to an example embodiment.

FIG. 4 is a block diagram illustrating a packet according to an example embodiment. The packet 402 may, for example, be used to transmit data during a data burst. Packet 402 may include a header (e.g., MAC header) 404, a payload 406, and a CRC (cyclic redundancy check) 408. The header 404 may include a number of fields, such as for example, a header type 410, which may indicate whether header 404 is compressed or uncompressed. The compressed header may exclude (or not include) one or more fields (or provide one or more shorter header fields), as compared to the regular or uncompressed header, as described in greater detail below. The header 404 may include a EC field 412, which may indicate whether the payload 406 is encrypted. A CRC indication (CI) field 414 may indicate if a CRC is present or not. An encryption key sequence (EKS) 415 may be provided. The header 404 may also include a reserved field 416. In an example embodiment, reserved field 416 may indicate whether header 404 is compressed or uncompressed, rather than providing this function in the header type field 410. A length field 418 may indicate a length of the payload (or alternatively may indicate the length of the packet 402). A connection identifier (CID) 420 may identify a connection. A header checksum sequence (HCS) 422 may provide a header checksum sequence that is applied to the header 404. These are merely some of the fields that may be included in a MAC header, and other fields may be included as well.

An uncompressed header may typically include a number of fields, as shown in FIG. 4, for example. However, in some cases a data burst may be transmitted using a compressed header in order to conserve resources. For example, the uncompressed header may exclude (or not include) one or more fields that would typically be included within the uncompressed header. For example, according to an example embodiment, the compressed MAC header for a data burst may exclude (or not include) the CID field 420, a redundant field (not shown) in the MAC header 404, and possibly the reserved field 416. In addition, since a smaller MAC header 404 may be provided when compressed, the length field 418 may be smaller (use fewer bits) as compared to the regular or uncompressed MAC header 404. More details and example embodiments will now be described.

According to an example embodiment, a BS may assign a persistent resource allocation to a MS or to a CID. The persistent resource allocation may be a UL (uplink, from MS to BS) resource allocation or a DL (downlink, from BS to MS) resource allocation. The persistent resource allocation may provide a recurring resource, such as a group of symbols every X frames (e.g., every frame, every other frame, every 4 frames or other period). The persistent resource allocation may be assigned to a connection or CID, which may, for example, be associated with periodic traffic application (e.g., which may transmit or receive a substantially predictable amount of traffic over a period of time), such as a VOIP application. For example, a persistent resource allocation may be assigned to a VOIP connection of a MS, such as a group of symbols or burst every four frames (for example as shown in FIG. 3). This may allow the VOIP device or application at the MS to regularly transmit (for UL persistent resource allocation) and/or receive (for a DL persistent resource allocation) data using regularly received or periodic resources, based on one persistent IE that assigns the persistent resource allocation, rather than requiring an allocation or Map IE to assign or allocate resources for each frame. Therefore, the use of a persistent resource allocation may reduce Map or control overhead, at least in some cases.

However, periodic traffic applications, such as VOIP applications, may occasionally have silence periods, e.g., where the periodic traffic application may not generate or receive the expected amount of traffic. As a result of such silence periods (e.g., VOIP silence periods), at least some of the resources provided as the persistent resource allocation may be unused or wasted for one or more frames.

Therefore, according to an example embodiment, a station (e.g., BS, RS, MS) that has been assigned a persistent resource allocation, may transmit either a persistent data burst (which may also be referred to as a persistent sub-burst) or a non-persistent data burst (which may be referred to as a non-persistent sub-burst) via the persistent resource allocation. For example, a first application (at a station) associated with the connection that has been assigned the persistent resource allocation may transmit a persistent data burst via the persistent resource allocation when it has data to transmit. Otherwise, when the connection that has been assigned the persistent resource allocation does not have (sufficient) data to transmit (for example), then a second application (associated with a second CID that was not assigned the persistent resource allocation) at the station may transmit a non-persistent data burst via the persistent resource allocation. This may allow the station to make use of the persistent resource allocation during periods of non-use or silence by the connection that was assigned the persistent resource allocation.

In both cases, either a persistent data burst or a non-persistent data burst may be transmitted using a packet 402, which may include a MAC header 404, payload 406 and CRC 408, for example. However, according to an example embodiment, the persistent data burst may include a compressed header (e.g., which may omit or exclude a CID 420 and possibly other fields) since it may be assumed, e.g., in the absence of a CID, that the persistent resource allocation is being used by the connection (or CID) that was assigned the persistent resource allocation. Thus, for example, in the absence of a CID in the header 404, the identity of the connection or CID that is transmitting may be determined by a receiving station based on the location or identity of the resources used. This is because the resources of the persistent resource allocation were previously assigned to a specific connection (identified by a CID) by the persistent allocation IE 310 (FIG. 3, for example). Thus, in the case of the assigned connection transmitting via the persistent resource allocation, a CID provided within header 404 may be considered redundant information (and may be omitted), based on the persistent allocation IE which previously assigned the persistent resource allocation to a specific connection.

Thus, according to an example embodiment, a compressed MAC header (see FIG. 4) may be used to transmit a persistent data burst via the persistent resource allocation. The compressed MAC header may exclude or omit one or more fields (as compared to a uncompressed MAC header), such as by omitting or excluding: a CID field 420, reserved field 416, a redundant field (not shown); also a length field 418 may be reduced in the compressed header, since fewer bits may be required to identify a length of the packet or of the header. Other fields in the compressed MAC header 404 may also be omitted or reduced, depending on the situation or application.

According to an example embodiment, the non-persistent data burst may be transmitted in a packet that includes a regular (or uncompressed) header 404. The uncompressed header may typically include the CID field 420 that identifies the connection that is using the persistent resource allocation (e.g., as this usage of the resource by the non-persistent IE may deviate from the default assignment made by the persistent allocation IE).

According to an example embodiment, a field, such as the header type 410, or the reserved field 416, in the MAC header 404 may indicate whether or not the MAC header 404 of the data burst is compressed or uncompressed. For example, the uncompressed MAC header 404 of a non-persistent data burst (transmitted via the persistent resource allocation) may include a field (such as header type 410) indicating that the MAC header of the non-persistent data burst is uncompressed. Similarly, the compressed MAC header of the persistent data burst may include a field (such as header type 410) that indicates that the MAC header of the persistent data burst is compressed. For example, when a station receives the data burst, the header type field 410 may be checked to determine the format of the header (e.g., either compressed or uncompressed), and the header 404 of the data burst may be decoded accordingly.

For example, a VOIP application (at a MS) associated with CID 1 may be assigned an UL persistent resource allocation, e.g., via a persistent allocation IE 310. An email program (or other application) at the MS associated with CID 2 is not assigned the persistent resource application. Thus, the VOIP application of the MS may send a persistent data burst in a first frame via the persistent resource allocation, e.g., using packet 402. Packet 402 for the persistent data burst may, for example, may include a compressed header, e.g., by excluding or omitting the CID field (and possibly other fields or reducing one or more fields). The header type field 410 (or other field) may indicate a compressed header. The receiving BS may determine that the persistent data burst is provided for connection CID 2 based on the absence of the CID field, and/or based on the HT field 410 indicating a compressed header.

Later, e.g., during or after a period of VOIP silence (e.g., where the VOIP application may have little or no data to transmit), the MS may allow the email program (associated with CID 2) to transmit a non-persistent data burst in a second (or subsequent) frame via the persistent resource allocation. The non-persistent data burst may include an uncompressed header that includes a CID field that identifies CID 2 (associated with the email program of the MS). The header type field 410 may indicate an uncompressed header for the non-persistent data burst. The BS may determine the connection based on the CID field 420.

Figure 5:
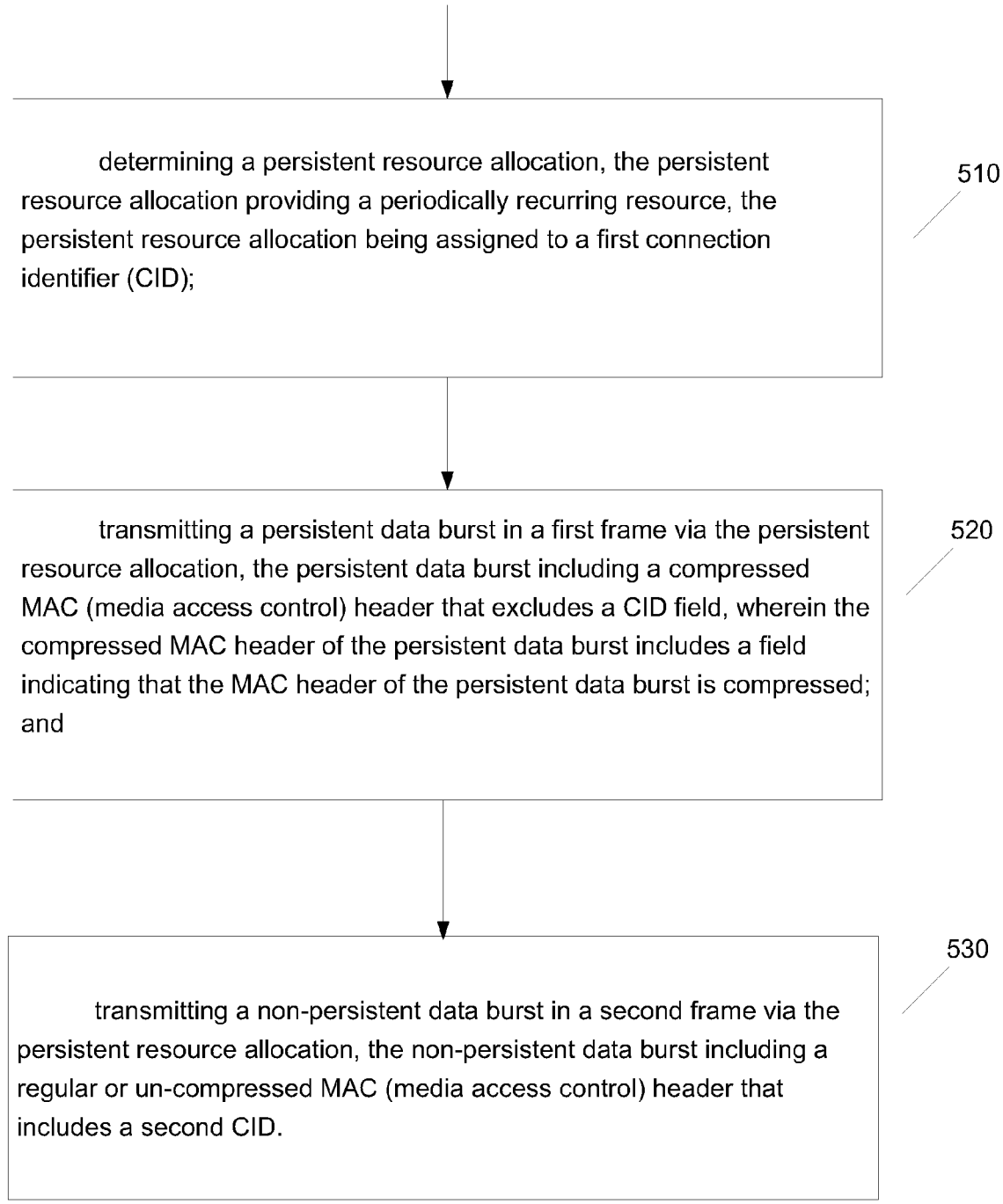
FIG. 5 is a flow chart illustrating operation of a wireless node according to an example embodiment.

FIG. 5 is a flow chart illustrating operation of a wireless node according to an example embodiment. Operation 510 may include determining a persistent resource allocation, the persistent resource allocation providing a periodically recurring resource, the persistent resource allocation being assigned to a first connection identifier (CID). Operation 520 may include transmitting a persistent data burst in a first frame via the persistent resource allocation, the persistent data burst including a compressed MAC (media access control) header that excludes a CID field, wherein the compressed MAC header of the persistent data burst includes a field indicating that the MAC header of the persistent data burst is compressed. And, operation 530 may include transmitting a non-persistent data burst in a second frame via the persistent resource allocation, the non-persistent data burst including a regular or un-compressed MAC (media access control) header that includes a second CID.

According to an example embodiment, in the method of FIG. 5, the un-compressed MAC header of the non-persistent data burst may include a field that indicates that the MAC header of the non-persistent data burst is un-compressed.

According to an example embodiment, operation 510 may include a base station transmitting an information element to assign the persistent resource allocation to the first CID.

According to an example embodiment, operation 510 may include a mobile station receiving an information element that assigns the persistent resource allocation to the first CID, the first CID being associated with the mobile station.

According to an example embodiment, operation 510 may include a mobile station receiving an information element that assigns the persistent resource allocation to the first CID that is associated with a periodic traffic application of the mobile station that generates periodic traffic.

According to an example embodiment, operation 510 may include a mobile station receiving an information element that assigns the persistent resource allocation to the first CID, the first CID being associated with a Voice Over IP (VOIP) application of the mobile station, wherein the transmitting the non-persistent data burst in a second frame via the persistent resource allocation is performed during a silence period of the VOIP application.

According to an example embodiment, operation 510 may include receiving an information element (IE) at a mobile station, the persistent IE including an allocation flag indicating an allocation, a persistent flag indicating that the resource allocation is persistent, and an allocation period indicating a recurrence period of the persistent resource allocation.

According to an example embodiment, operation 510 may include transmitting a information element (IE) from a base station, the persistent IE including an allocation flag indicating an allocation, a persistent flag indicating that the resource allocation is persistent, and an allocation period indicating a recurrence period of the persistent resource allocation.

According to another example embodiment, an apparatus, e.g., 800, may include a controller (e.g., 804) configured to determine a persistent resource allocation, the persistent resource allocation providing a periodically recurring resource, the persistent resource allocation being assigned to a first connection identifier (CID); a wireless transmitter (e.g., transmitter of transceiver 802) may be configured to transmit a persistent data burst in a first frame via the persistent resource allocation, the persistent data burst including a compressed MAC (media access control) header that excludes a CID field, the MAC header of the persistent data burst including a field that indicates that the MAC header of the persistent data burst is compressed; and the wireless transmitter may be configured to transmit a non-persistent data burst in a second frame via the persistent resource allocation, the non-persistent data burst including a regular or un-compressed MAC (media access control) header that includes a second CID, the MAC header of the non-persistent data burst including a field that indicates that the MAC header of the persistent data burst is un-compressed.

Figure 6:
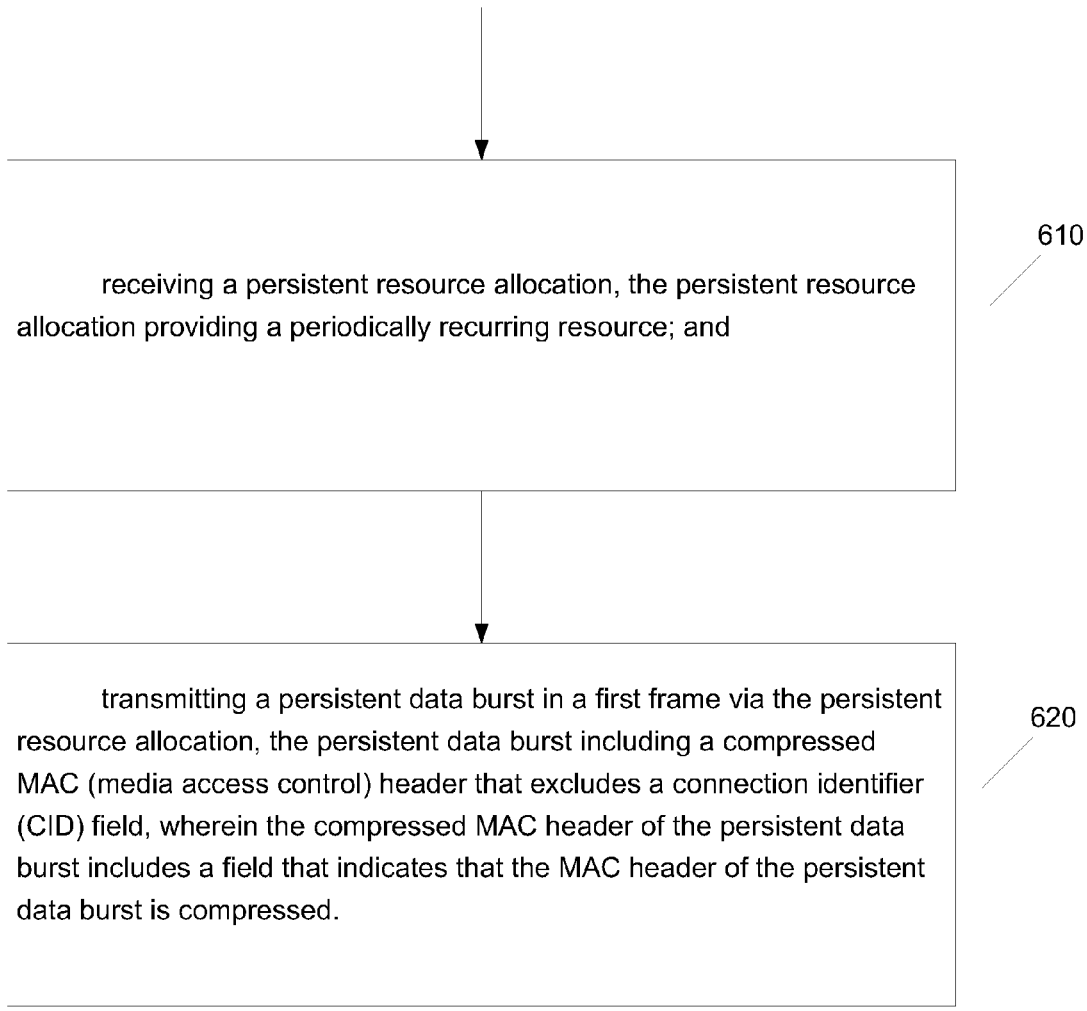
FIG. 6 is a flow chart illustrating operation of a wireless node according to another example embodiment.

FIG. 6 is a flow chart illustrating operation of a wireless node according to another example embodiment. The flow chart of FIG. 6 may illustrate an example of using a persistent resource allocation in a wireless network. Operation 610 may include receiving a persistent resource allocation, the persistent resource allocation providing a periodically recurring resource. Operation 620 may include transmitting a persistent data burst in a first frame via the persistent resource allocation, the persistent data burst including a compressed MAC (media access control) header that excludes a connection identifier (CID) field, wherein the compressed MAC header of the persistent data burst includes a field that indicates that the MAC header of the persistent data burst is compressed.

According to an example embodiment, operation 610 may include receiving a persistent information element (IE) from a base station, the persistent IE including an allocation flag indicating an allocation, a persistent flag indicating that the resource allocation is persistent, and an allocation period indicating a recurrence period of the persistent resource allocation.

According to an example embodiment, in the flow chart of FIG. 6, the allocation period may indicate one or more frames between recurring resources provided as part of the persistent resource allocation.

According to an example embodiment, the method of FIG. 6 may further include transmitting a non-persistent data burst in a second frame via the persistent resource allocation, the persistent data burst including a regular or un-compressed MAC (media access control) header that includes a CID (connection identifier) field, the un-compressed MAC header of the non-persistent data burst including a field indicating that the un-compressed MAC header is un-compressed.

According to an example embodiment, in the flow chart of FIG. 6, the persistent resource allocation may be assigned to a first connection identifier (CID) that is associated with a VOIP application or other periodic traffic application.

According to an example embodiment, in the flow chart of FIG. 6, the non-persistent data burst may include an uncompressed MAC header that includes a second CID.

According to an example embodiment, in the flow chart of FIG. 6, the persistent resource allocation may be assigned to a first CID (connection identifier), the persistent data burst being associated with the first CID, and the compressed MAC header of the persistent data burst not including the first CID, the method further including: transmitting a non-persistent data burst in a second frame via the persistent resource allocation, the non-persistent data burst including a regular or un-compressed MAC (media access control) header that includes a second CID, the first CID and the second CID being associated with a common mobile station.

According to another example embodiment, an apparatus may include a wireless receiver configured to receive a persistent resource allocation, the persistent resource allocation providing a periodically recurring resource; and a wireless transmitter configured to transmit a persistent data burst in a first frame via the persistent resource allocation, the persistent data burst including a compressed MAC (media access control) header that excludes a connection identifier (CID) field, wherein the compressed MAC header of the persistent data burst includes a field that indicates that the MAC header of the persistent data burst is compressed.

Figure 7:
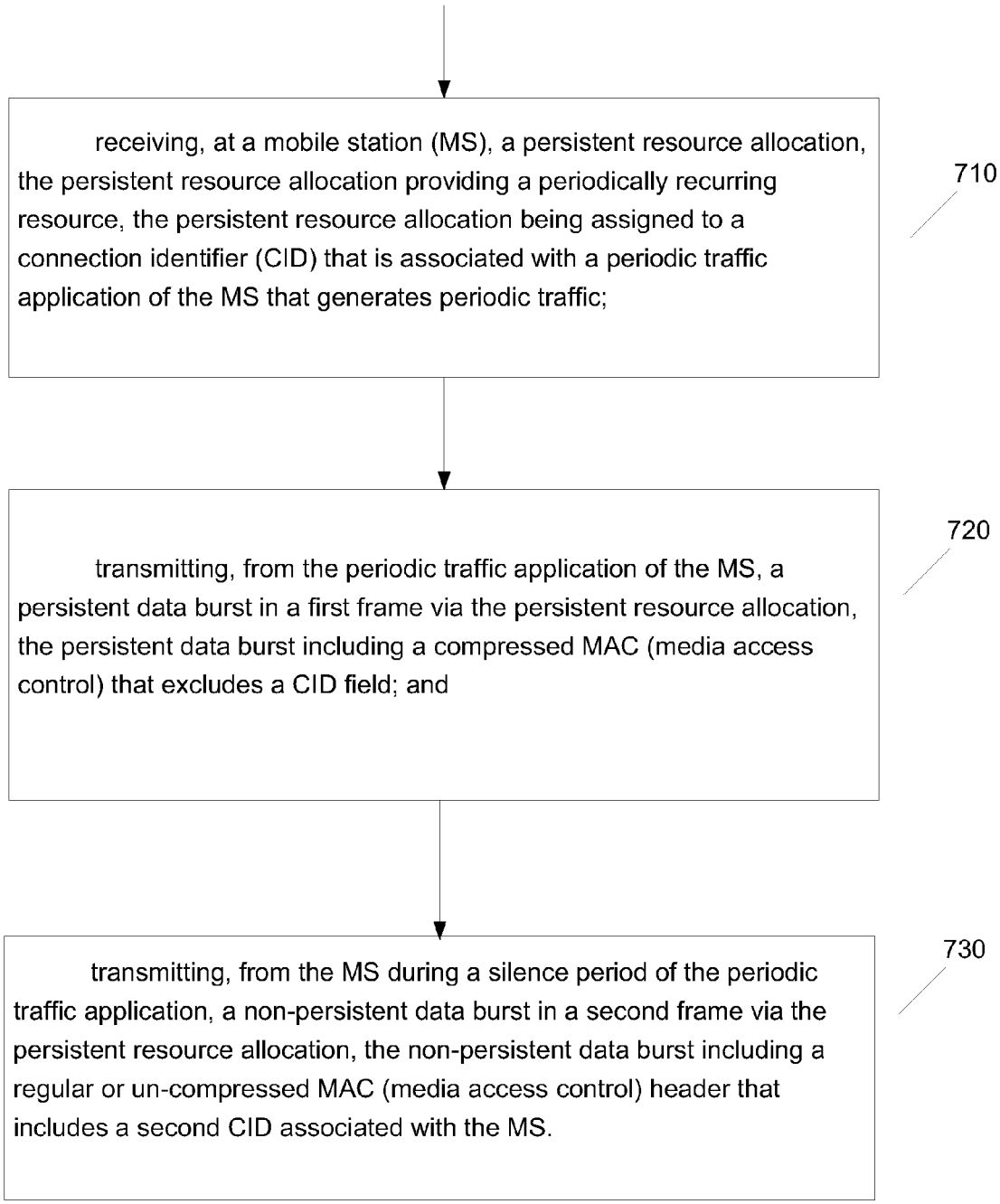
FIG. 7 is a flow chart illustrating operation of a wireless node according to yet another example embodiment.

FIG. 7 is a flow chart illustrating operation of a wireless node according to another example embodiment. Operation 710 may include receiving, at a mobile station (MS), a persistent resource allocation, the persistent resource allocation providing a periodically recurring resource, the persistent resource allocation being assigned to a connection identifier (CID) that is associated with a periodic traffic application of the MS that generates periodic traffic. Operation 720 may include transmitting, from the periodic traffic application of the MS, a persistent data burst in a first frame via the persistent resource allocation, the persistent data burst including a compressed MAC (media access control) that excludes a CID field. Operation 730 may include transmitting, from the MS during a silence period of the periodic traffic application, a non-persistent data burst in a second frame via the persistent resource allocation, the non-persistent data burst including a regular or un-compressed MAC (media access control) header that includes a second CID associated with the MS.

According to an example embodiment, in the flow chart of FIG. 7, the periodic traffic application may be a Voice Over IP (VOIP) application.

According to an example embodiment, in the flow chart of FIG. 7, the compressed MAC header of the persistent data burst may include a field that indicates that the MAC header of the persistent data burst is compressed.

According to an example embodiment, in the flow chart of FIG. 7, the un-compressed MAC header of the non-persistent data burst includes a field that indicates that the MAC header of the non-persistent data burst is un-compressed.

According to another example embodiment, an apparatus may include a wireless receiver configured to receive, at a mobile station (MS), a persistent resource allocation, the persistent resource allocation providing a periodically recurring resource, the persistent resource allocation being assigned to a connection identifier (CID) that is associated with a periodic traffic application of the MS that generates periodic traffic; a wireless transmitter configured to transmit, from the periodic traffic application of the MS, a persistent data burst in a first frame via the persistent resource allocation, the persistent data burst including a compressed MAC (media access control) that excludes a CID field; and wherein the wireless transmitter further may be configured to transmit, from the MS during a silence period of the periodic traffic application, a non-persistent data burst in a second frame via the persistent resource allocation, the non-persistent data burst including a regular or un-compressed MAC (media access control) header that includes a second CID associated with the MS.

Figure 8:
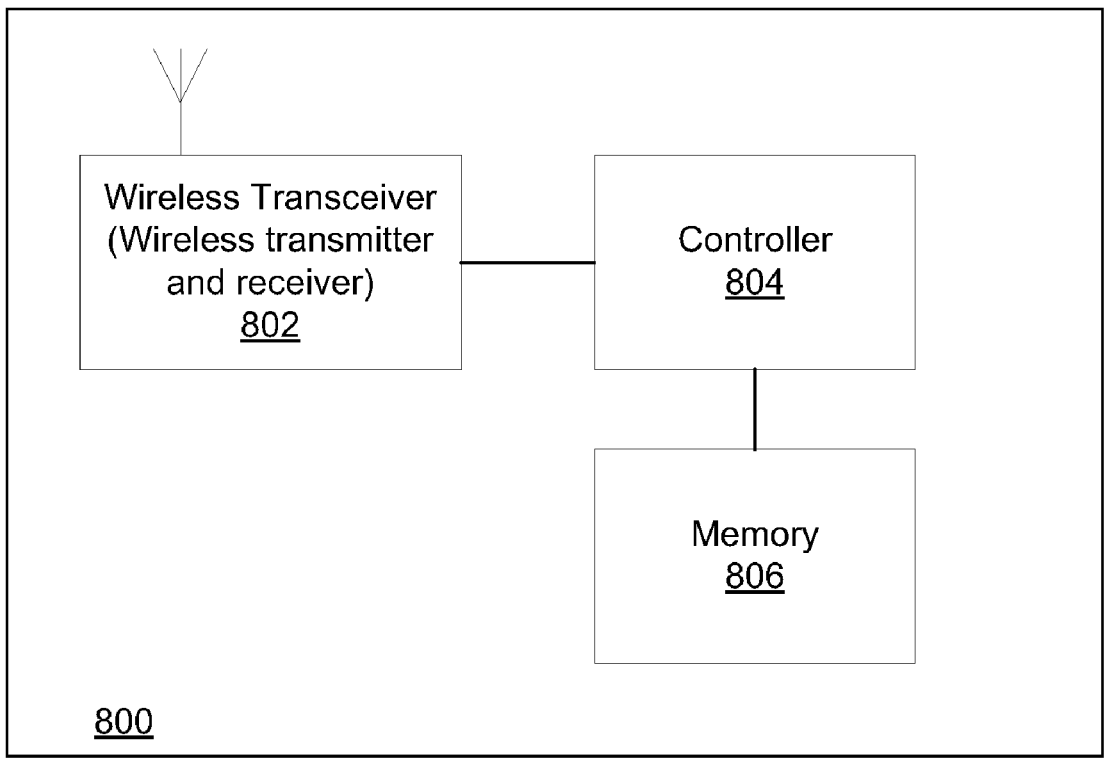
FIG. 8 is a block diagram of a wireless node according to an example embodiment.

FIG. 8 is a block diagram of a wireless station (or wireless node) 800 according to an example embodiment. The wireless station 800 (e.g., base station 104 or mobile node 106, 108, 110) may include, for example, a wireless transceiver (or wireless interface) 802, including a transmitter to transmit signals and a receiver to receive signals, a controller 804 to control operation of the station and execute instructions or software, and a memory 806 to store data and/or instructions. Controller 804 may also make decisions or determinations, generate frames or messages for transmission, decode received frames or messages for further processing, and other tasks or functions described herein.

Controller 804 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 1004, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program (s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
  determining a persistent resource allocation, the persistent resource allocation providing a periodically recurring resource, the persistent resource allocation being assigned to a first connection identifier (CID);
  transmitting a persistent data burst in a first frame via the persistent resource allocation, the persistent data burst including a compressed MAC (media access control) header that excludes a CID field, wherein the compressed MAC header of the persistent data burst includes a field indicating that the MAC header of the persistent data burst is compressed; and
  transmitting a non-persistent data burst in a second frame via the persistent resource allocation, the non-persistent data burst including a regular or un-compressed MAC (media access control) header that includes a second CID.

2. The method of claim 1 wherein the un-compressed MAC header of the non-persistent data burst includes a field that indicates that the MAC header of the non-persistent data burst is un-compressed.

3. The method of claim 1 wherein the determining comprises a base station transmitting an information element to assign the persistent resource allocation to the first CID.

4. The method of claim 1 wherein the determining comprises a mobile station receiving an information element that assigns the persistent resource allocation to the first CID, the first CID being associated with the mobile station.

5. The method of claim 1 wherein the determining comprises a mobile station receiving an information element that assigns the persistent resource allocation to the first CID that is associated with a periodic traffic application of the mobile station that generates periodic traffic.

6. The method of claim 1 wherein the determining comprises a mobile station receiving an information element that assigns the persistent resource allocation to the first CID, the first CID being associated with a Voice Over IP (VOIP) application of the mobile station, wherein the transmitting the non-persistent data burst in a second frame via the persistent resource allocation is performed during a silence period of the VOIP application.

7. The method of claim 1 wherein the determining comprises receiving an information element (IE) at a mobile station, the persistent IE including an allocation flag indicating an allocation, a persistent flag indicating that the resource allocation is persistent, and an allocation period indicating a recurrence period of the persistent resource allocation.

8. The method of claim 1 wherein the determining comprises transmitting a information element (IE) from a base station, the persistent IE including an allocation flag indicating an allocation, a persistent flag indicating that the resource allocation is persistent, and an allocation period indicating a recurrence period of the persistent resource allocation.

9. An apparatus comprising:
   a controller configured to determine a persistent resource allocation, the persistent resource allocation providing a periodically recurring resource, the persistent resource allocation being assigned to a first connection identifier (CID);
   a wireless transmitter configured to transmit a persistent data burst in a first frame via the persistent resource allocation, the persistent data burst including a compressed MAC (media access control) header that excludes a CID field, the MAC header of the persistent data burst including a field that indicates that the MAC header of the persistent data burst is compressed; and
   the wireless transmitter also configured to transmit a non-persistent data burst in a second frame via the persistent resource allocation, the non-persistent data burst including a regular or un-compressed MAC (media access control) header that includes a second CID, the MAC header of the non-persistent data burst including a field that indicates that the MAC header of the persistent data burst is un-compressed.

10. A method of using a persistent resource allocation in a wireless network, the method comprising:
    receiving a persistent resource allocation, the persistent resource allocation providing a periodically recurring resource; and
    transmitting a persistent data burst in a first frame via the persistent resource allocation, the persistent data burst including a compressed MAC (media access control) header that excludes a connection identifier (CID) field, wherein the compressed MAC header of the persistent data burst includes a field that indicates that the MAC header of the persistent data burst is compressed.

11. The method of claim 10 wherein the receiving the persistent resource allocation comprises receiving a persistent information element (IE) from a base station, the persistent IE including an allocation flag indicating an allocation, a persistent flag indicating that the resource allocation is persistent, and an allocation period indicating a recurrence period of the persistent resource allocation.

12. The method of claim 11 wherein the allocation period indicates one or more frames between recurring resources provided as part of the persistent resource allocation.

13. The method of claim 10 and further comprising transmitting a non-persistent data burst in a second frame via the persistent resource allocation, the persistent data burst including a regular or un-compressed MAC (media access control) header that includes a CID (connection identifier) field, the un-compressed MAC header of the non-persistent data burst including a field indicating that the un-compressed MAC header is un-compressed.

14. The method of claim 10 wherein the persistent resource allocation is assigned to a first connection identifier (CID) that is associated with a VOIP application or other periodic traffic application.

15. The method of claim 13 wherein the non-persistent data burst includes an uncompressed MAC header that includes a second CID.

16. The method of claim 10 wherein the persistent resource allocation is assigned to a first CID (connection identifier), the persistent data burst being associated with the first CID, and the compressed MAC header of the persistent data burst not including the first CID, the method further comprising:
    transmitting a non-persistent data burst in a second frame via the persistent resource allocation, the non-persistent data burst including a regular or un-compressed MAC (media access control) header that includes a second CID, the first CID and the second CID being associated with a common mobile station.

17. An apparatus comprising:
    a wireless receiver configured to receive a persistent resource allocation, the persistent resource allocation providing a periodically recurring resource; and
    a wireless transmitter configured to transmit a persistent data burst in a first frame via the persistent resource allocation, the persistent data burst including a compressed MAC (media access control) header that excludes a connection identifier (CID) field, wherein the compressed MAC header of the persistent data burst includes a field that indicates that the MAC header of the persistent data burst is compressed.

18. A method of using a persistent resource allocation in a wireless network, the method comprising:
    receiving, at a mobile station (MS), a persistent resource allocation, the persistent resource allocation providing a periodically recurring resource, the persistent resource allocation being assigned to a connection identifier (CID) that is associated with a periodic traffic application of the MS that generates periodic traffic;
    transmitting, from the periodic traffic application of the MS, a persistent data burst in a first frame via the persistent resource allocation, the persistent data burst including a compressed MAC (media access control) header that excludes a CID field; and
    transmitting, from the MS during a silence period of the periodic traffic application, a non-persistent data burst in a second frame via the persistent resource allocation, the non-persistent data burst including a regular or un-compressed MAC (media access control) header that includes a second CID associated with the MS.

19. The method of claim 18 wherein the periodic traffic application is a Voice Over IP (VOIP) application.

20. The method of claim 18 wherein the compressed MAC header of the persistent data burst includes a field that indicates that the MAC header of the persistent data burst is compressed.

21. The method of claim 18 wherein the un-compressed MAC header of the non-persistent data burst includes a field that indicates that the MAC header of the non-persistent data burst is un-compressed.

22. An apparatus comprising:
    a wireless receiver configured to receive, at a mobile station (MS), a persistent resource allocation, the persistent resource allocation providing a periodically recurring resource, the persistent resource allocation being assigned to a connection identifier (CID) that is associated with a periodic traffic application of the MS that generates periodic traffic;

a wireless transmitter configured to transmit, from the periodic traffic application of the MS, a persistent data burst in a first frame via the persistent resource allocation, the persistent data burst including a compressed MAC (media access control) header that excludes a CID field; and
the wireless transmitter further configured to transmit, from the MS during a silence period of the periodic traffic application, a non-persistent data burst in a second frame via the persistent resource allocation, the non-persistent data burst including a regular or un-compressed MAC (media access control) header that includes a second CID associated with the MS.

* * * * *